United States Patent
Bharwani

(10) Patent No.: US 9,663,033 B2
(45) Date of Patent: May 30, 2017

(54) SYSTEMS AND METHODS FOR COLLISION AVOIDANCE USING A SCORED-BASED COLLISION REGION OF INTEREST

(71) Applicant: Caterpillar Inc., Peoria, IL (US)

(72) Inventor: Kiran Kumar Ram Bharwani, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 61 days.

(21) Appl. No.: 14/706,859

(22) Filed: May 7, 2015

(65) Prior Publication Data

US 2016/0325675 A1 Nov. 10, 2016

(51) Int. Cl.
*B60Q 1/00* (2006.01)
*B60Q 9/00* (2006.01)

(52) U.S. Cl.
CPC .................. *B60Q 9/008* (2013.01)

(58) Field of Classification Search
CPC G08G 1/16; G08G 1/164; G08G 1/20; G08G 1/207; G01C 21/3461; G01S 13/931; G01S 2013/936; B60Q 9/008
USPC ............ 340/435, 903; 701/50, 300, 301
See application file for complete search history.

(56) References Cited

U.S. PATENT DOCUMENTS

| 6,246,932 | B1 | 6/2001 | Kageyama et al. |
|---|---|---|---|
| 7,545,261 | B1 | 6/2009 | Harrington |
| 7,656,311 | B2 | 2/2010 | Holmes et al. |
| 8,190,173 | B2 | 5/2012 | Olson |
| 8,477,021 | B2 | 7/2013 | Slack |
| 8,583,361 | B2 | 11/2013 | Lewis et al. |
| 8,660,791 | B2 | 2/2014 | Koehrsen et al. |
| 8,666,936 | B2 | 3/2014 | Wallace |
| 8,818,567 | B2 | 8/2014 | Anderson |
| 2009/0043462 | A1 | 2/2009 | Stratton et al. |
| 2010/0042940 | A1* | 2/2010 | Monday ............... G09B 29/106 715/764 |
| 2011/0254700 | A1 | 10/2011 | Gharsalli et al. |
| 2012/0232779 | A1 | 9/2012 | Koehrsen et al. |
| 2012/0296562 | A1* | 11/2012 | Carlson ............... B61L 15/0027 701/301 |

* cited by examiner

*Primary Examiner* — Thomas Mullen

(74) *Attorney, Agent, or Firm* — Miller, Matthias & NHull

(57) ABSTRACT

Systems and methods for collision avoidance using scored-based collision region of interest are disclosed. One method includes receiving data relating to a plurality of machines disposed at a worksite, the data comprising at least one of a position, speed, and direction of movement for at least one machine of the plurality of machines; determining based at least on the data, a score for at least one machine of the plurality of machines, the score representing a criticality; based at least on the determined score, selecting, a group of machines from the plurality of machines; determining, a spatial map representing a position for at least one machine of the selected group of machines; and determining, based at least on the spatial map, a likelihood of collision for at least one machine of the selected group of machines.

20 Claims, 10 Drawing Sheets

SYSTEMS AND METHODS FOR COLLISION AVOIDANCE USING A SCORED-BASED COLLISION REGION OF INTEREST

TECHNICAL FIELD

This disclosure relates generally to worksite operations and more particularly to collision avoidance between machines operating at a worksite.

BACKGROUND

A worksite, such as a mining site, a construction site, or the like, will typically involve a multitude of machines moving throughout the worksite and performing a variety of tasks. For instance, multiple haul trucks may be used to move material between an excavation zone and a dumping zone. Many of the machines may be heavy, slow to stop, and offer poor visibility for the machine operator to perceive other machines moving about the worksite. Accordingly, there is a significant risk of collision between the machines.

One method of collision avoidance is disclosed in U.S. Pat. No. 8,477,021 (the '021 patent). The '021 patent discloses a system and method for providing a proximity warning relating to a machine operating at a worksite. In order to provide such a proximity warning, the position of obstacles (e.g., machines, objects, personnel) at a worksite is tracked and a safe zone is defined around the machine. In one aspect, if an obstacle is at the edge of or within the machine's safe zone, a proximity warning is provided to the machine operator.

Although the '021 patent describes a system and method of proximity detection and warning, the system and method may be unsuitable to worksites involving a large number of machines since the method provides no means for excluding one or more of the machines or other obstacles from the proximity warning determination. As the number of machines or other obstacles at a worksite increases, the method and system of the '021 patent may be unable to efficiently track all of the machines or other obstacles and determine whether a proximity warning should be provided for each machine or other obstacle. Due to the computational effort required in such a determination and resulting delay, the system and method may be unable to provide a proximity warning in sufficient time to avoid a collision. These and other shortcomings are addressed by this disclosure.

SUMMARY

This disclosure relates to systems and methods for collision avoidance using a scored-based collision region of interest. One method includes receiving, by one or more processors, data relating to a plurality of machines disposed at a worksite, the data comprising at least one of a position, speed, and direction of movement for at least one machine of the plurality of machines; determining, by one or more processors, based at least on the data, a score for at least one machine of the plurality of machines, the score representing a criticality; based at least on the determined score, selecting, by one or more processors, a group of machines from the plurality of machines; determining, by one or more processors, a spatial map representing a position for at least one machine of the selected group of machines; and determining, by one or more processors, based at least on the spatial map, a likelihood of collision for at least one machine of the selected group of machines.

In an aspect, a system includes a processor and a memory bearing instructions that, upon execution by the processor, cause the system at least to: receive data relating to a plurality of machines disposed at a worksite, the data comprising at least one of a position, speed, and direction of movement for at least one machine of the plurality of machines; determine, based at least on the data, a score for at least one machine of the plurality of machines, the score representing a criticality; based at least on the score, select a group of machines from the plurality of machines; and determine a spatial map representing a position for at least one machine of the selected group of machines.

In an aspect, a computer readable storage medium bears instructions that, upon execution by one or more processors, effectuate operations comprising: receiving data relating to a plurality of machines disposed at a worksite, the data comprising at least one of a position, speed, and direction of movement for at least one machine of the plurality of machines; determining, based at least on the data, a score for at least one machine of the plurality of machines, the score representing a criticality; based at least on the score, selecting a group of machines from the plurality of machines; and determining a spatial map representing a position for at least one machine of the selected group of machines.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION

This disclosure provides systems and methods for analysis of a worksite. In various aspects, collision avoidance systems and methods are disclosed using a scored-based collision region of interest. The score-based collision region of interest may be used to facilitate the efficient spatial analysis, such as the generation of a spatial map, of machines operating at a worksite and the determination of whether one of the machines presents an unacceptable likelihood of collision.

In certain aspects, a first machine at a worksite may receive operational data from the other machines at the worksite, such as the other machines' respective position, speed, or direction of travel. The first machine may determine a score for each of the other machines that reflects criticality (e.g., a degree of criticality) with respect to other machines. For example, another machine that is moving quickly and in the direction of the first machine may receive a score representing a high degree of criticality. As a further example, another machine that is stationary and positioned away from the first machine may receive a score representing a low degree of criticality. The score can be represented by discrete categories such as high, medium, and low and such categories may be customized for various worksites, machines, and the like. The score may be numerical, such as a range of 0-100. Other scoring mechanisms may be used.

In some aspects, having determined a score for each of the other machines, the first machine may perform a spatial analysis, such as generating a spatial map representing the positions of the machines within the worksite, while excluding one or more of the machines and its associated data from the spatial map. For example, the machines with scores representing a low degree of criticality may be excluded from the generation of the spatial map. Based on the spatial map, a determination may be made that one of the other machines presents a likelihood of collision with the first machine and an alert may be generated, such as on an operator console in the first machine. By excluding one or more machines based on their respective scores, less computational effort is required to generate the spatial map and the spatial map may be generated more quickly. Therefore, the systems and methods disclosed may accommodate worksites with larger number of machines, while minimizing processing time for a spatial map to be generated and, if applicable, an alert to be provided.

Figure 1:
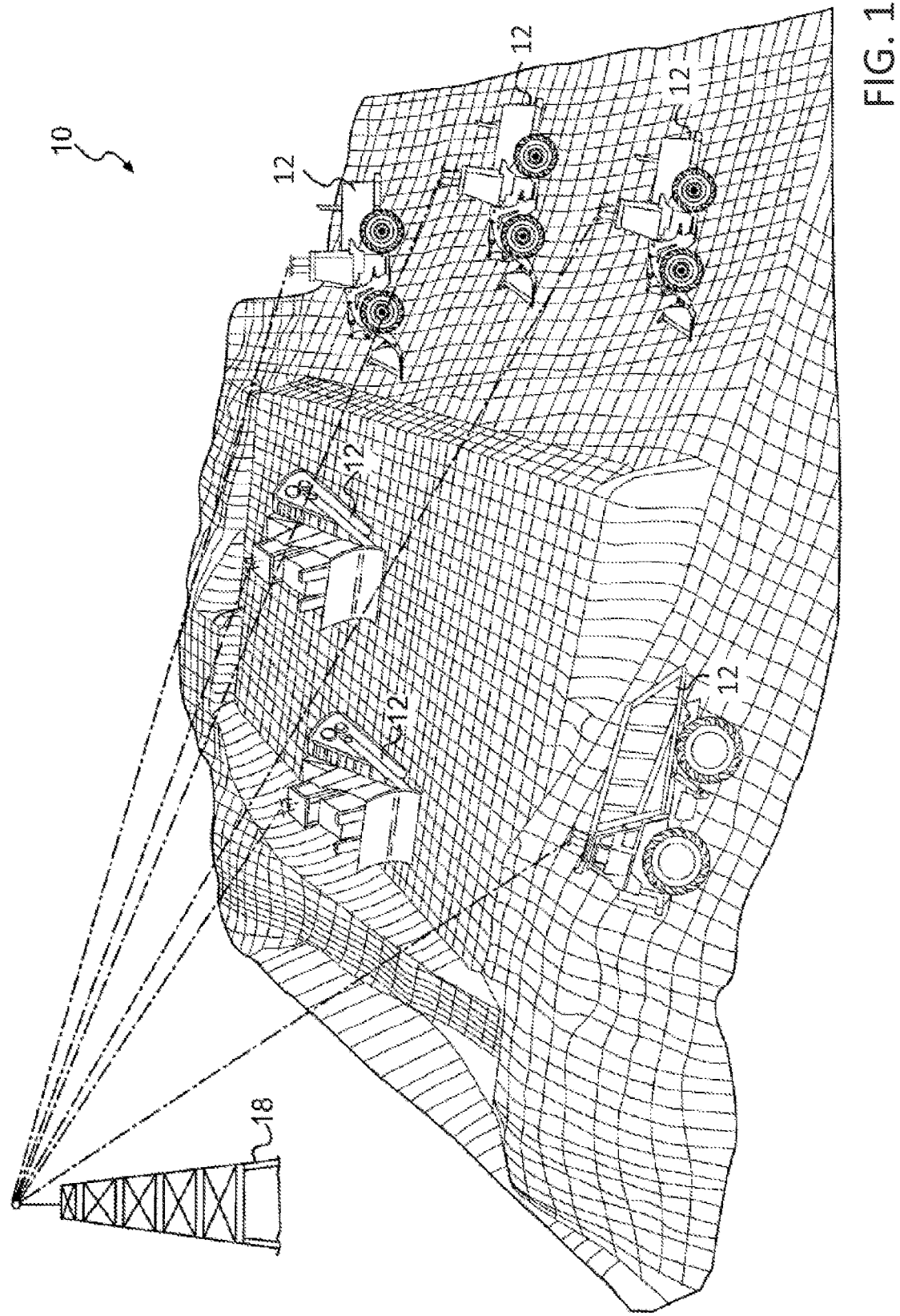
FIG. 1 illustrates an example worksite in accordance with aspects of the disclosure.

FIG. 1 shows a worksite 10 such as, for example, an open pit mining operation. As part of the mining function, various machines 12 may operate at or between different locations of the worksite 10. These machines 12 may include one or more digging machines, one or more loading machines, one or more hauling machines, one or more transport machines, and/or other types of machines known in the art. Each of the machines 12 at the worksite 10 may be in communication with each other and with a central station 18 by way of wireless communication to remotely transmit and receive operational data, such as positional data, and instructions.

A digging machine may refer to any machine that reduces material at the worksite 10 for the purpose of subsequent operations (e.g., for blasting, loading, and hauling operations). Examples of a digging machine may include excavators, backhoes, dozers, drilling machines, trenchers, drag lines, etc. A loading machine may refer to any machine that lifts, carries, and/or loads material that has been reduced by a digging machine onto waiting hauling machines. Examples of a loading machine may include a wheeled or tracked loader, a front shovel, an excavator, a cable shovel, a stack reclaimer, or any other similar machine. A hauling machine may refer to any machine that carries the excavated materials between different locations within the worksite 10. Examples of a hauling machine may include an articulated truck, an off-highway truck, an on-highway dump truck, a wheel tractor scraper, or any other similar machine. Laden hauling machines may carry overburden from areas of excavation within the worksite 10, along haul roads to various dump sites, and return to the same or different excavation areas to be loaded again.

The central station 18 may be configured to receive, aggregate, and/or store operational data, including positional data, from each of the machines 12 operating at the worksite 10. The central station 18, in turn, may transmit the aggregated operational data for all of the machines 12 to each of the machines 12. In this manner, each of the machines 12 may be informed of the operations of the other machines 12, such as each of the other machines' 12 respective position, orientation, and speed. The transmitted operational data may be used by each of the machines 12 to determine a spatial map of the worksite 10 and the machines 12 operating therein and make a determination as to a likelihood of collision.

In an aspect, operations at the worksite 10 may be tracked and logged as data points. For example, positional information relating to the location, orientation, and/or movement of the machines 12 may be monitored, stored, and transmitted to one or more of the machines 12. Subsequently, the positional information may be used to construct a spatial map representing the relative position, orientation, and/or movement of all or some of the machines 12 at the worksite 10. Such positional information may be used to generate a score for one or more machines. In an aspect, the score for each of the machines 12 may be based upon a speed of the respective machine 12 and or a direction of travel. For example, machines 12 having a speed over a certain threshold speed (e.g., a speed at which one of the machines 12 may be able to cover the distance to another of the machines 12 within a pre-defined time interval) may be scored as a high criticality. As another example, machines 12 having a direction of travel away from other machines 12 may be designated with a low criticality score.

Figure 2:
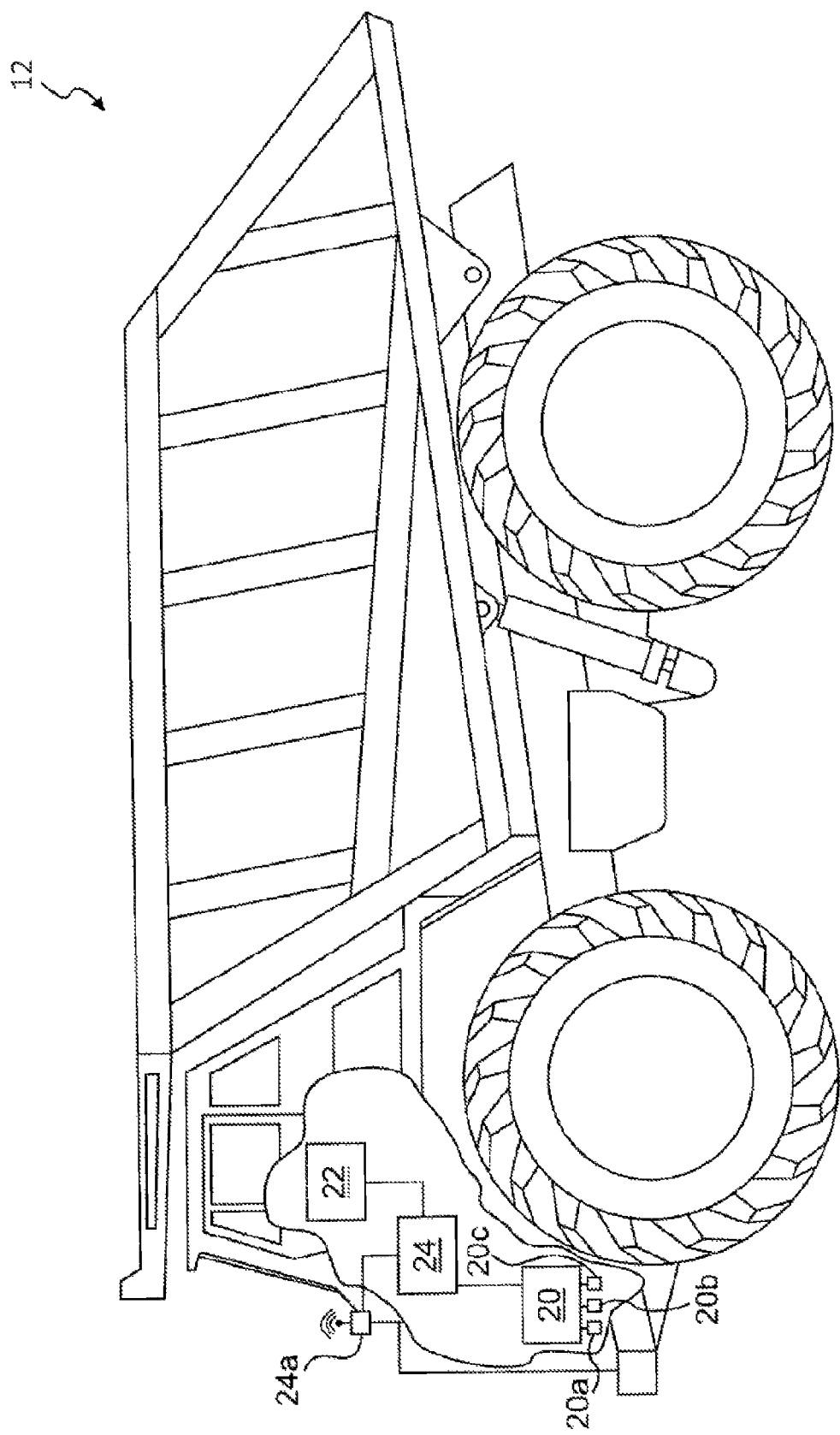
FIG. 2 illustrates a schematic side view of an example machine in accordance with aspects of the disclosure.

FIG. 2 shows one example machine 12 that may be operated at the worksite 10. It should be noted that, although the depicted machine may embody a hauling machine, the following description may be equally applied to any machine operating at the worksite 10. The machine 12 may record and transmit data to the central station 18 (referring to FIG. 1) during its operation on a communication channel as defined herein. Similarly, the central station 18 may analyze the data and transmit information to the machine 12 on a communication channel as defined herein. The data transmitted to the central station 18 may include positional data, operator data, machine identification data, performance data, worksite data, diagnostic data, and other data, which may be automatically monitored from onboard the machine 12 and/or manually observed and input by machine operators. The information remotely transmitted back to the machines 12 may include positional data for all machines 12 operating at the worksite 10, electronic terrain maps, machine configuration commands, instructions, recommendations and/or the like. Using the information transferred back to one of the machines 12, a spatial map representing the position and movement of the machines 12 within the worksite 10 may be created and updated with subsequently received information from the central station 18.

To facilitate the collection, recording, and transmitting of data from the machines 12 at the worksite 10 to the central station 18 (referring to FIG. 1) and vice versa, each of the machines 12 may include an onboard control module 20, an operator interface module 22, and a communication module 24. The communication module 24 may communicate over a communication channel as defined herein with a transceiver 24a. Data received by the control module 20 and/or the operator interface module 22 may be sent off board to the central station 18 by way of the communication module 24. The communication module 24 may also be used to send instructions and/or recommendations from the central station 18 to an operator of the machine 12 by way of the operator interface module 22. It is contemplated that additional or different modules may be included onboard the machine 12, if desired.

The control module 20 may include a plurality of sensors 20a, 20b, 20c distributed throughout the machine 12 and/or the operator and configured to gather data from the operator and/or various components and subsystems of the machine 12. It is contemplated that a greater or lesser number of sensors may be included than that shown in FIG. 2.

In an aspect, the sensors 20a-c may include a positional sensor, such as global navigation satellite system (GNSS) sensor, by which the positional coordinates of the machine 12, its direction of travel, and/or speed may be ascertained and subsequently transmitted to the central station 18. The sensors 20a-c may further include a speed sensor, such as a wheel speed sensor, for determining the speed at which the machine 12 is traveling.

In another aspect, the sensors 20a-c may be associated with a power source (not shown), a transmission (not shown), a traction device, a work implement, an operator station, and/or other components and subsystems of the machine 12. These sensors may be configured to provide data gathered from each of the associated components and subsystems. Other pieces of information may be generated or maintained by the control module 20 such as, for example, time of day, date, weather, road or surface conditions, and machine location (global and/or local).

The operator interface module 22 may be located onboard the machine and may be used to collect data and/or provide collision detection information, such as a visualization of a spatial map of the worksite 10 or an alert of a potential collision involving the machine 12, to a machine operator. The operator interface module 22 may include or be communicatively connected to one or more operator data input devices such as a press-able button, a movable dial, a keyboard, a touchscreen, a touchpad, a pointing device, or any other means of input. The operator interface module 22 may further include a display, such as a liquid crystal display (LCD) screen, by which a machine operator may view a spatial map of the worksite 10, including the positions and movements of the machines 12 at the worksite 10. The display may also function to provide the machine operator with a collision message or alert, such as if the operator's machine 12 is likely to be involved in a collision with another machine 12. The operator interface module 22 may further include a means of providing an audio alert, such as a speaker, buzzer, or bell.

The communication module 24 may also have the ability to record the monitored and/or manually input data. For example, the communication module 24 may include a data recorder (not shown) having a recording medium (not shown). In some cases, the recording medium may be portable, and data may be transferred from the machine 12 to the central station 18 or between the machines 12 using the portable recording medium.

Figure 3:
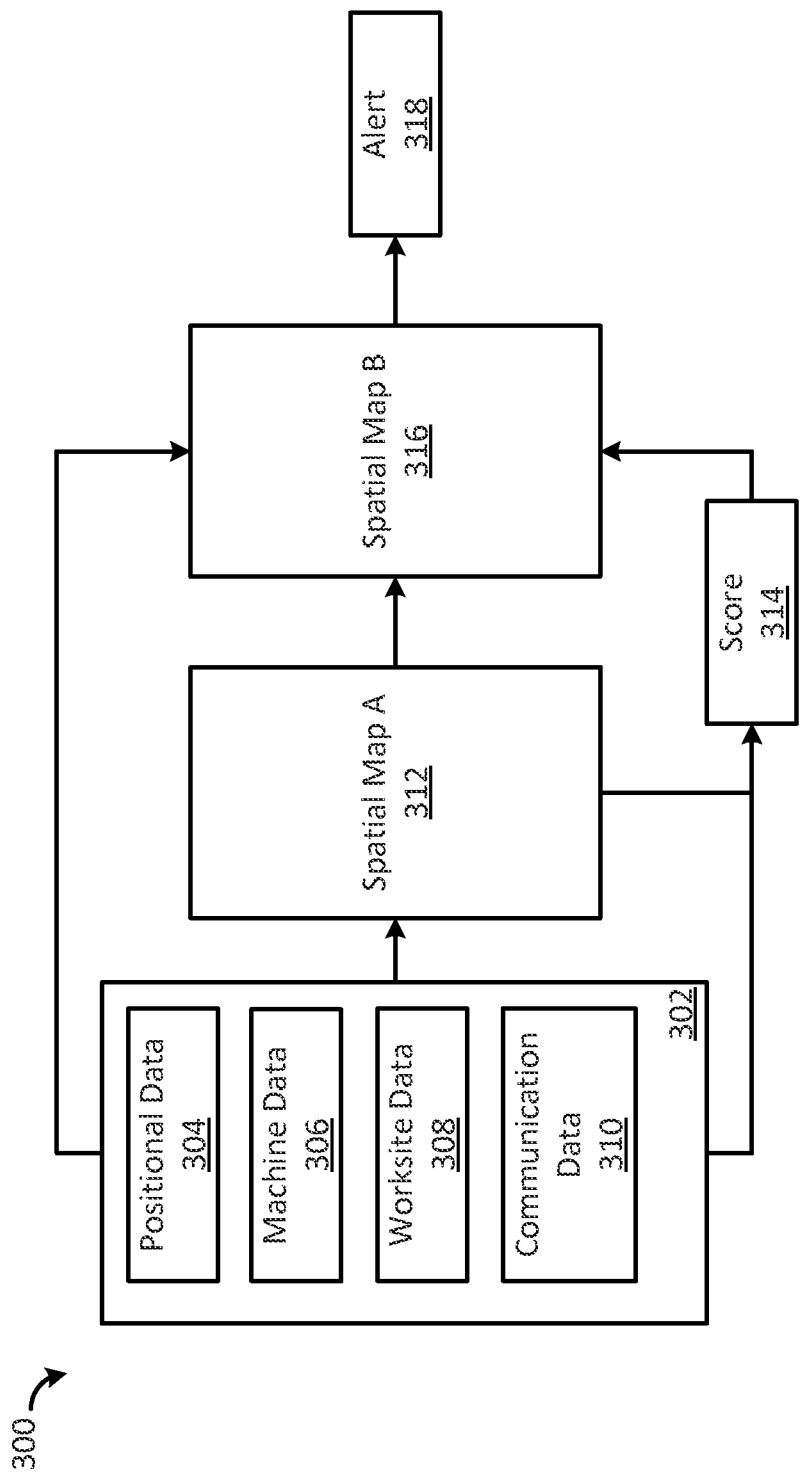
FIG. 3 illustrates a block diagram of an example data flow in accordance with aspects of the disclosure.

FIG. 3 depicts an example flow diagram 300 of various operations relating to systems and methods of collision avoidance using a scored-based collision region of interest. In an aspect, a spatial map 312 (or other spatial analysis) may be determined by, for example, the control module 20 onboard one of the machines 12. The spatial map 312 may include representations of one or more machines 12 operating within the worksite 10 and the position (relative, absolute, or otherwise) of one or more of the machines 12. The spatial map 312 may additionally include representations of a projected position of the machines 12, such as a position where the machine 12 is expected to be located after a certain period of time, based on a known speed and movement direction of the machine 12 and/or the path by which the machines 12 reach the machines' 12 respective projected positions. The spatial map 312 may further indicate the orientation of the machines 12, such as which part of the machine 12 is the front of the machine. The spatial map 312 may be used to determine a proximity (e.g., number of feet or other unit of distance) between each of the machines 12.

The spatial map 312 may be determined based on operational data 302. Operational data 302 may include any data reflecting various operational aspects of the worksite 10. Operational data 302 may include positional data 304, machine data 306, worksite data 308, and/or communication data 310.

Positional data 304 may include any data reflecting any positional aspect of the machines 12 or other objects at the worksite 10. Positional data 304 may include a position, such as the position of one of the machines 12. A position may be absolute, such as a set of geographical latitude, longitude, and/or elevation coordinates, or relative, such as a set of coordinates relative to a fixed point of reference at the worksite 10 or relative to one of the machines 12. The position of one of the machines 12 may be collected from a GNSS sensor onboard the machine 12. Positional data 304 may further include data reflecting the movement of the machines 12, such as the speed of one of the machines 12, its orientation, and/or its direction of movement. The accuracy or precision of the positional data 304 may additionally be included in the positional data 304. For instance, a position derived from a GNSS sensor may indicate that the GNSS sensor has a margin of error of three feet or that the GNSS sensor is only capable of determining a position in three foot increments. Positional data 304, such as the speed, orientation, and/or movement direction of one of the machines 12, may be collected from sensors 20a-c onboard the machine 12. Positional data 304 for one of the machines 12 may be transmitted to the central station 18, where it may be propagated to all of the machines 12 at the worksite 10.

Machine data 306 may include any data pertaining to the machines 12 and the machines' 12 operation within the worksite 10. Machine data 306 may include static information on one of the machines 12 such as the make and model of the machine 12, a dimension (e.g., length, width, or height), a weight, a performance characteristic (e.g., top speed, acceleration capability, braking capability, and the like), a machine manufacture date or age, a usage or maintenance/repair history, etc. Machine data 306 may also include real-time performance data for one of the machines 12, such as an indication of a quantity, type, and/or weight of payload being carried. Machine data 306 may further include diagnostic data that may reflect the operational status (e.g., functioning properly, malfunctioning, etc.) of one or more components of one of the machines 12. Machine data 306 may be collected by sensors 20a-c onboard the machines 12.

Worksite data 308 may include any data concerning the general operation of the worksite 10. For example, worksite data 308 may include information on the layout and planning of the worksite 10, such as a terrain and/or road map. Worksite data 308 may include information pertaining to the roads of the worksite 10, such as the material composition of a road (e.g., paved, dirt, mud or the like), the condition of a road, the maximum speed at which the machines 12 may safely operate on a road, or a level of deterioration of a road. Worksite data 308 may additionally include weather information. Worksite data 308 may, as appropriate, be collected by the sensors 20a-c onboard the machines 12 or other sensors located at the worksite 10.

Communication data 310 may include any data relating to the communication of the machines 12. For example, communication data 310 may include the frequency of data communication from one of the machines 12 to the central station 18 or vice versa. Similarly, communication data 310 may indicate a time when new data for one of the machines 12 will be next received. Communication data 310 may further reflect the communication status of one of the machines, such as whether one of the machines 12 is wirelessly connected to the central station 18 or whether one of the machines 12 has failed to provide an anticipated communication to the central station 18. Communication data 310 may additionally reflect whether one of the machines 12 and its associated data have been included in prior iterations of a spatial map generation or other spatial analysis.

In an aspect, the score 314 for each of the machines 12 may be determined based on the spatial map 312 and/or operational data 302. The score 314 may be determined from the perspective of one of the machines 12 in relation to the one of the other machines 12 at the worksite 10. For instance, the score 314 that machine A determines for machine B will likely be different from the score 314 that machine C determines for machine B. Indeed, it is specifically contemplated that each of the machines 12 at the worksite 10 may perform an onboard determination, such as by the respective onboard control module 20, of the scores 314 for each of the other machines 12 at the worksite 10. The score 314 may represent a metric by which one of the machines 12 and associated data may be excluded from the creation or update of a spatial map, such as spatial map 316. Accordingly, the score 314 determined by one of the machines 12 for another machine 12 may reflect a degree of criticality with respect to the two machines. The degree of criticality may represent one or more factors (e.g., speed, direction of travel, position, machine type, etc.) that affect a likelihood of collision between the two machines 12 and/or other metric relating to collision, such as a metric representing the severity of a collision if one were to occur. The severity of a collision may represent, for example, an amount of damage to one of the machines 12 or a degree of injury to an operator of one of the machines 12. The score 314 may be represented by a numeral within a pre-defined range, such as a score of 2 in a range of 1 through 5, where 1 represents the lowest level of criticality (e.g., low chance of collision and/or a low severity of collision) and 5 represents the highest level of criticality (e.g., high chance of collision and/or a high severity of collision). In other aspects, the score 314 may be represented by a determination of a classification from a set of classifications representing a range of criticalities (e.g., critical, warning, or safe).

The score 314 may be determined based on one or more parameters. A parameter going towards a determination of the score 314 may include one or more proximities between the machines 12, particularly a proximity between the machine 12 determining the score 314 and another machine 12. A close proximity may indicate a high degree of criticality while a distant proximity may indicate a low degree of criticality. A parameter may include one or more aspects of positional data 304, such as the speed at which each of the machines 12 may be moving, wherein a high speed may indicate a high degree of criticality and a low speed or complete lack of speed (e.g., the machine 12 is standing still) may indicate a low degree of criticality. Yet another parameter may include a direction that each of the machines 12 may be moving. For instance, one of the machines 12 moving towards another machine 12 may indicate a high degree of criticality, while one of the machines 12 moving in the opposition direction with respect to another machine 12 may indicate a low degree of criticality. One or more aspects of positional data 304 may be combined together and/or with other operational data 302 to determine a projected position of one of the machines. For example, a position, speed, direction of travel, and time interval until next update for one of the machines 12 may be used to determine a travel path and projected position for that machine 12 during that time interval. The travel path and projected position may be considered as parameters used to determine the score 314.

A parameter used to determine the score 314 may include data included in the communication data 310, such as an amount of time since one of the machines 12 has communicated data to the central station 18 and/or an amount of time since the machine 12 determining the score 314 has received data concerning one of the machines 12. If the machine 12 determining the score 314 for another machine 12 has not received updated data concerning that other machine 12 for a lengthy period of time, this might indicate a high degree of criticality since the status (e.g., proximity, location, etc.) of the other machine 12 is uncertain. In the same vein, whether one of the machines 12 has been excluded from one or more preceding updates of a spatial map may be relevant to the determination of the score 314.

The score 314 may additionally be based on machine data 306, such as a characteristic of one of the machines 12, such as the machine's 12 weight, braking capacity, or maintenance history. To illustrate, a heavy machine may lend towards a high degree of criticality since a collision with a heavy machine may pose more of a danger and cause more damage than a collision with a light machine. A machine with poor braking capacity may be less capable of avoiding a collision and, therefore, may indicate a high degree of criticality. Similarly, a machine with a neglected maintenance history (e.g., has not been serviced according to manufacturer recommendations) may suffer from degraded performance and exhibit a reduced capacity to brake and swerve to avoid a collision and, therefore, may indicate a high degree of criticality. Machine data 306 relevant to determining the score 314 may further include real-time performance data, such as an indication of a type or weight of a payload. If one of the machines 12 carries a dangerous material (e.g., an explosive or a hazardous material), it may pose a particularly high degree of danger if collided with and, therefore, may point to a high degree of criticality. If one of the machines 12 is laden with a heavy payload, this may adversely affect the ability of the machine 12 to stop and/or swerve to avoid a collision. This also may indicate a high degree of criticality. Conversely, one of the machines 12 that is empty may be more capable of avoiding a collision and, thus, may indicate a low degree of criticality. Diagnostic data for one of the machines 12 may also be a factor in determining the score 314. For example, if diagnostic data indicates that the steering system of one of the machines 12 is malfunctioning, this may point to a high degree of criticality. On the other hand, if diagnostic data indicates that all of the mechanical components of one of the machines 12 are functioning properly, this may indicate a lower degree of criticality.

The score 314 may be further based on worksite data 308. For example, the road layout of the worksite 10 and the positions of the machines 12 may together be used to determine which machines 12 are traveling on which roads. If two machines 12 are both operating on the same road, this may indicate a high degree of criticality. On the other hand, two machines 12 operating on two parallel but separate roads—despite what may be a close proximity between the two machines 12—may signify a low degree of criticality. As another example, the condition of a road at the worksite 10 may also be used to determine the score 314. A wet, icy, or muddy road may adversely affect the ability of machines 12 on the road to stop or swerve to avoid a collision, and thus may indicate a high degree of criticality. Data reflecting the weather (e.g., rain, sleet, snow, low temperature, or the like) at the worksite 10 may similarly be used to determine the score 314.

It will be appreciated that each of the parameters upon which the score may be based may each be represented by a parameter score or other classification, similar to the score 314 but instead reflecting the criticality of that parameter. For example, a proximity parameter reflecting that one of the machines 12 is extremely close to another of the machines 12 may have a parameter score of 5. One or more parameter scores may be aggregated according to various methods to determine the score 314. For example, a mathematical average of the parameter scores may be determined, which in turn may become the score 314 or be used to determine the score 314. In some aspects, one or more of the parameter scores may be weighted relative to other parameter scores. For example, if a proximity parameter is considered to be more important than a communication frequency parameter, the proximity parameter may be weighted to have a larger effect on the determination of the score 314. To illustrate, if the score 314 is determined according to a mathematical average of the parameter scores, the proximity parameter score may be multiplied by a factor, such as 1.5, before the average is taken of all of the parameter scores. In an aspect, the score 314 may be determined according to a threshold for one or more parameters or parameter scores. For example, if a certain parameter or parameter score exceeds a pre-defined threshold, the score 314 may be determined at a pre-defined level of criticality, irrespective of other parameters and/or other parameter scores. As an illustration, the determination of the score 314 may employ a threshold for machine speed wherein if any of the machines 12 have a speed parameter exceeding 35 miles per hour, for example, the score 314 for that machine 12 reflects the highest degree of criticality (e.g., a 5 on a scale of 1-5). The aforementioned example methods of determining the score 314 may be combined. For instance, parameter scores may ordinarily be averaged to determine the score 314, but if one or more of the parameters exceeds a threshold set for that parameter, the average of the parameter scores may be overridden and the score 314 may be set to a pre-defined value based solely on the exceeding of the threshold.

In an aspect, the score 314 may be determined by comparing the position and/or projected position of each of the machines 12 with one or more pre-defined regions, wherein each the pre-defined regions corresponds to a score or classification, which in turn may include the score 314 for each of the machines 12 falling within that region.

Figure 4:
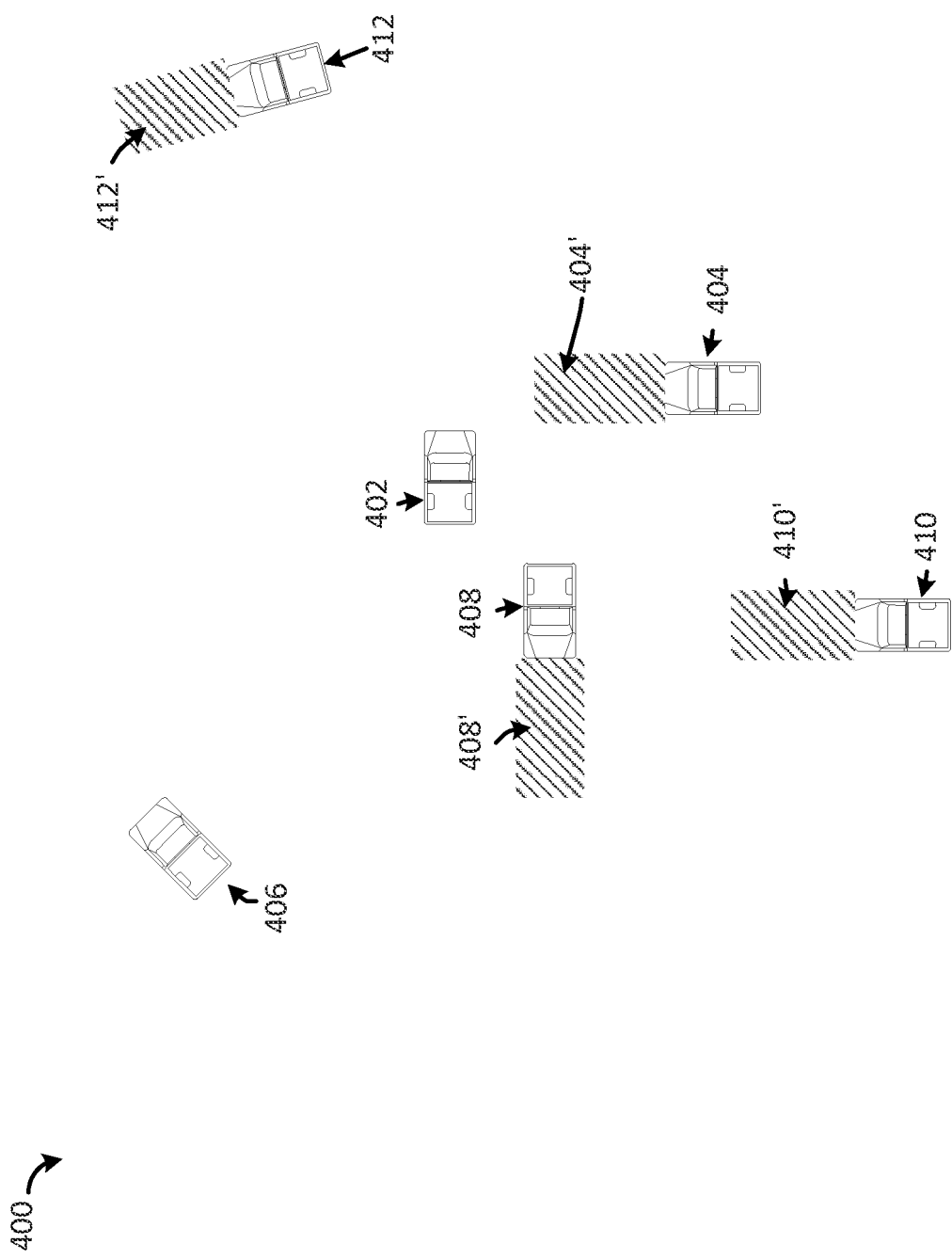
FIG. 4 illustrates a representation of a spatial map in accordance with aspects of the disclosure.

FIG. 4 depicts an example spatial map 400, such as an instance of the spatial map 312 or the spatial map 316. The spatial map 400 may be generated based on the operational data 302, including data reflecting certain parameters of one or more machines 12, such as speed, position, and/or directions of travel. The spatial map 400 may include a representation of machines 402-412, each illustrated to reflect a relative position from each other and within the worksite 10. The spatial map 400 may include a projected position 404', 408', 410', 412' of each of the machines 404, 408, 410, 412. The projected positions of machines 404, 408, 410, 412 are shown, respectively, as projected positions 404', 408', 410', 412'.

Figure 5:
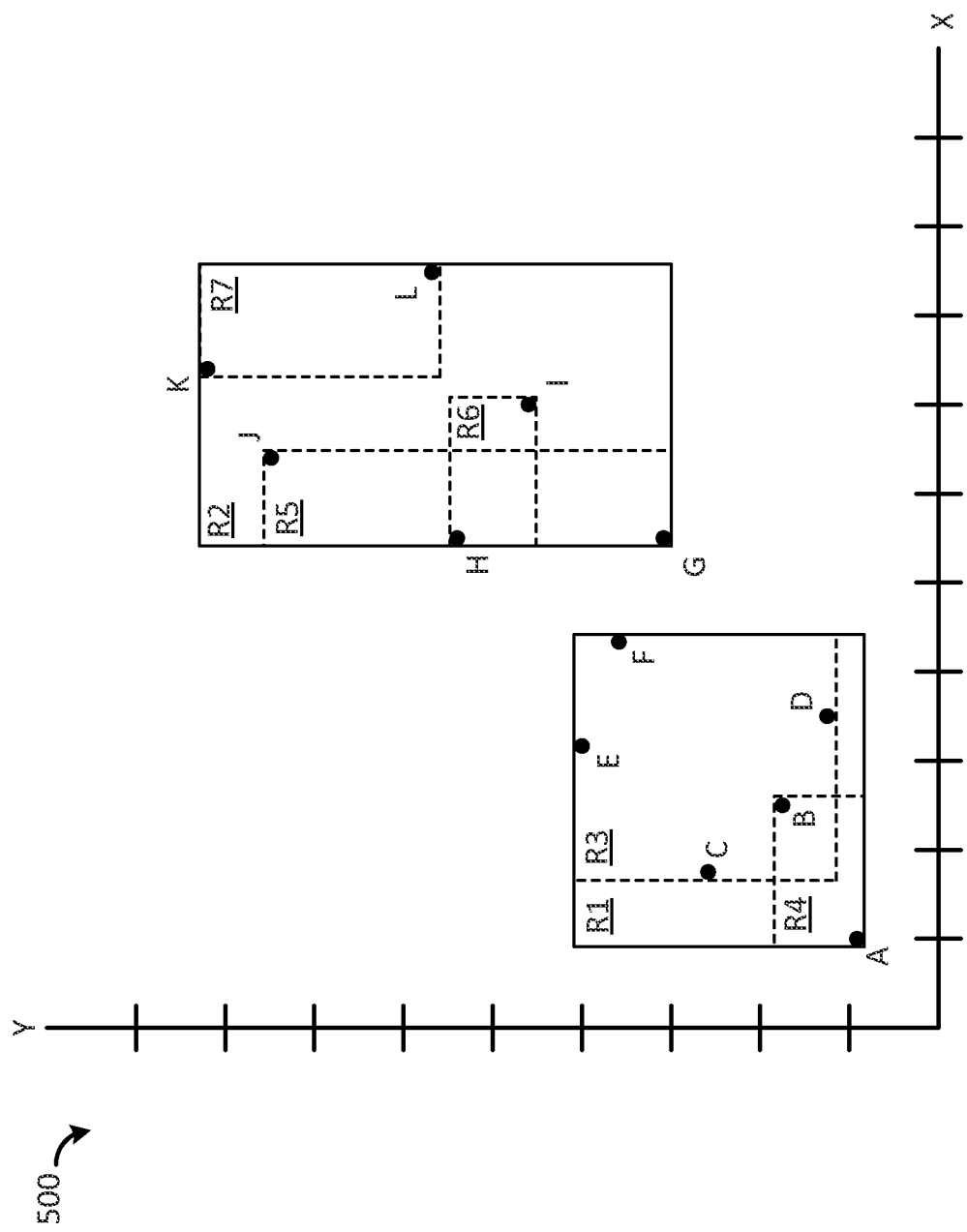
FIG. 5 illustrates a representation of a spatial map in accordance with aspects of the disclosure.

FIG. 5 depicts another example spatial map 500, such as an instance of the spatial map 312 or the spatial map 316. The spatial map 500 is in the form of a graphic X-Y coordinate representation of an R-tree. The positions of the machines 12 at the worksite 10 are represented as machines A-L on the spatial map 500. Using one of various algorithms or heuristics known by one skilled in the art, the machines A-L are grouped into one or more bounded regions R1-R7. As can be seen in FIG. 5, machines A-F are grouped into region R1. Machines A-B are further grouped into region R4 and machines C-F are further grouped into region R3. Machines G-L are grouped into region R2. Machines G and H are further grouped into region R5, machines H and I are further grouped into region R6, and machines K and L are further grouped into region R7. The algorithm or heuristic employed to group the machines A-L into regions R1-R7 may use operational data 302, reflecting certain parameters of one or more machines A-L, such as speed, position, and/or directions of travel. The spatial map 500 and its groupings of the machines A-L may be used, for example, to determine the proximity of two or more of the machines A-L and/or a likelihood of collision between two or more of the machines A-L.

Figure 6:
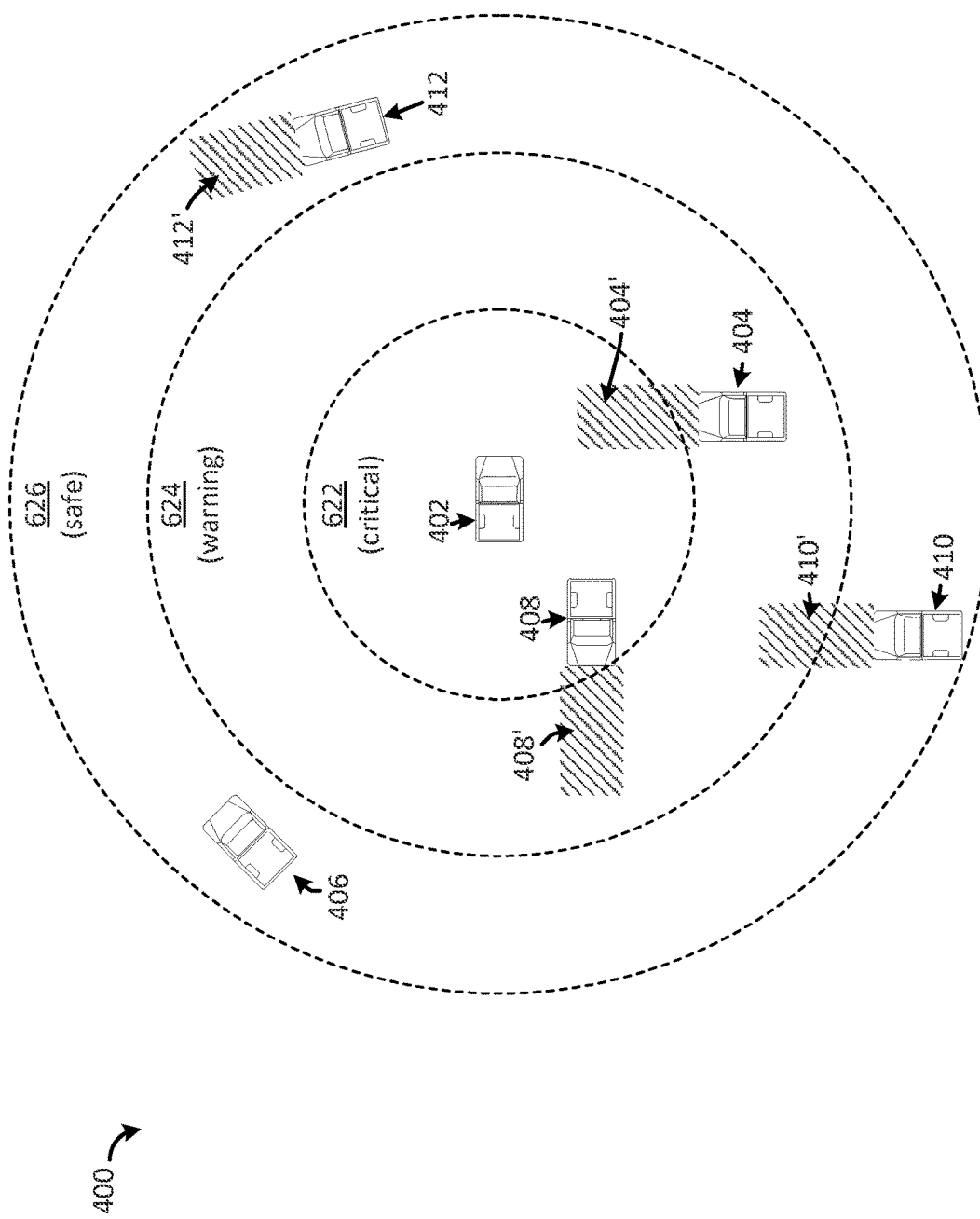
FIG. 6 illustrates a representation of a spatial map in accordance with aspects of the disclosure.

FIG. 6 illustrates the spatial map 400 of FIG. 4, which includes representations of machines 402-412 and the machines' 402-412 respective projected positions 402'-412'. Three regions 622, 624, and 626 are defined within the spatial map 400. Region 622 corresponds to a critical classification, region 624 corresponds to a warning classification, and region 626 corresponds to a safe classification. The regions 622, 624, and 626 are each defined with respect to machine 402, the machine for which the scores 314 in this example are determined. The score 314 for each of the machines 402-412 may be determined based on the position or projected position of that machine 402-412 within one of the regions 622, 624, and 626. For example, the projected position 408' of machine 408 is within region 624 and, therefore, the score 314 of machine 408 would be "warning." The projected position 404' of machine 404 is within region 622, thus, the score 314 of machine 404 would be "critical." The projected position 412' of machine 412 is within region 626, so the score 314 of machine 412 would be "safe." It will be readily appreciated that each of the regions 622, 624, and 626 may instead be associated with a numerical score, such as region 622 being associated with a score of 3, and so forth.

Based on the score 314, the operational data 302, and/or the spatial map 312, a spatial map 316 may be determined or generated. The spatial map 316 may be similar in form to the spatial map 312. In an aspect, the spatial map 316 may be a version of the spatial map 312 updated with new data, such as new operational data 302. For example, the control module 20 of one of the machines 12 may receive a data communication from the central station 18 with the most recent sets of data, such as operational data 302, collected from the other machines 12 at the worksite 10. In turn, the control module 20 may update aspects of the spatial map 312 with the newly-received recent sets of data to generate the spatial map 316. In another aspect, the spatial map 316 may be generated or determined without reference to a previous spatial map, such as the spatial map 312. For instance, the spatial map 316 may be generated or determined based solely on the operational data 302 and the score 314 (which, in this instance, may be based solely on the operational data 302).

In an aspect, the spatial map 316 may be generated or determined by using the score 314 to filter out or exclude one or more of the machines 12 and/or their respective associated data from the spatial map generation or determination process. For example, a score threshold may be used, by which machines 12 with scores 314 at or below the score threshold are excluded from the process of generating or determining the spatial map 316. For example, if the score 314 includes a numerical score from 1 to 5 (with 5 indicating the highest degree of criticality and 1 indicating the lowest degree of criticality), the score threshold may be 3. Therefore, machines 12 with a score 314 of 1 or 2 may be excluded from the generation or determination of the spatial map 316. Similarly, one or more scores 314 may be defined as to be excluded. For example, machines 12 with a score 314 of "safe" may be excluded from the generation or determination of the spatial map 316. The exclusion of one or more of the machines 12 and/or their respective associated data may provide the benefit of significantly reducing the computational effort required to generate a spatial map, thus reducing the generation time of the spatial map and improving the efficiency of the generating computing device, such as the control module 20 on one of the machines 12.

Upon the generation or determination of the spatial map 316, the spatial map 316 or a visual representation thereof may be displayed to an operator of the machine 12, such as via the operator interface module 22. As an example of a visual representation of the spatial map 316, a terrain map of the worksite 10 with representations of one or more of the machines 12 superimposed upon the map may be displayed to the operator. The position of the representations of the machines 12 and/or other aspects of the machines 12 (such as speed, direction of travel, type, payload, and the like) may be based on the spatial map 316. The operator may use the displayed spatial map 316 or visual representation thereof to remain informed of the relative positions of the machines 12 around the operator's machine 12 and, preferably, take corrective action if a collision may appear likely to occur. In some aspects, the machines 12 excluded from the spatial map 316 may still be represented in a visualization of the spatial map 316. For example, the excluded machines 12 may be represented at a last known location and may include a visual indicator that they have been excluded from the spatial map 316. For instance, representation of excluded machines 12 may be greyed out, colored a different color than the non-excluded machines 12, or marked with a pre-specified icon. The representations of excluded machines 12 may further include an indication of a number of update cycles or period of time for which the excluded machines 12 have not been updated in the spatial map 316. For instance, the representations of the excluded machines 12 may each be presented with a number of minutes since that machine 12 was last included in the spatial map 316.

Based on the spatial map 316, an alert 318 may be generated by, for example, the control module 20 onboard one of the machines 12. In an aspect, the spatial map 316 may be analyzed to determine if there is an unacceptable likelihood (e.g., exceeding a predefined threshold) of a collision between one of the machines 12, such as the machine determining the spatial map 316, and another machine 12. The analysis of the likelihood of collision may be based on the score 314 or other similarly calculated score. For instance, if one of the machines 12 has a score 314 of 5 (e.g., the highest degree of criticality), this may indicate an unacceptable likelihood of collision and the alert 318 may be generated. The alert may further be based on a proximity determination using the spatial map 316.

The alert 318 may be in the form of an audio alert, such as an alarm generated by a speaker of the operator interface module 22 of the machine 12. The alert 318 may additionally be in the form of a visual alert or notification, such as a flashing light or text, on a display of the operator interface module 22. A visual alert or notification on the display may be provided as part of the previously described display of the spatial map 316 or a visual representation thereof.

INDUSTRIAL APPLICABILITY

The industrial applicability of the systems and methods for collision avoidance using a scored-based collision region of interest described herein will be readily appreciated from the foregoing discussion. Although various machines 12 are described in relation to FIG. 1, those skilled in the art may understand that the machine 12 is not so limited and may include any manner of work vehicle or equipment that may be found at a worksite. Similarly, although a hauling machine is depicted in FIG. 2, any type of work vehicle or equipment may be used.

Figure 7:
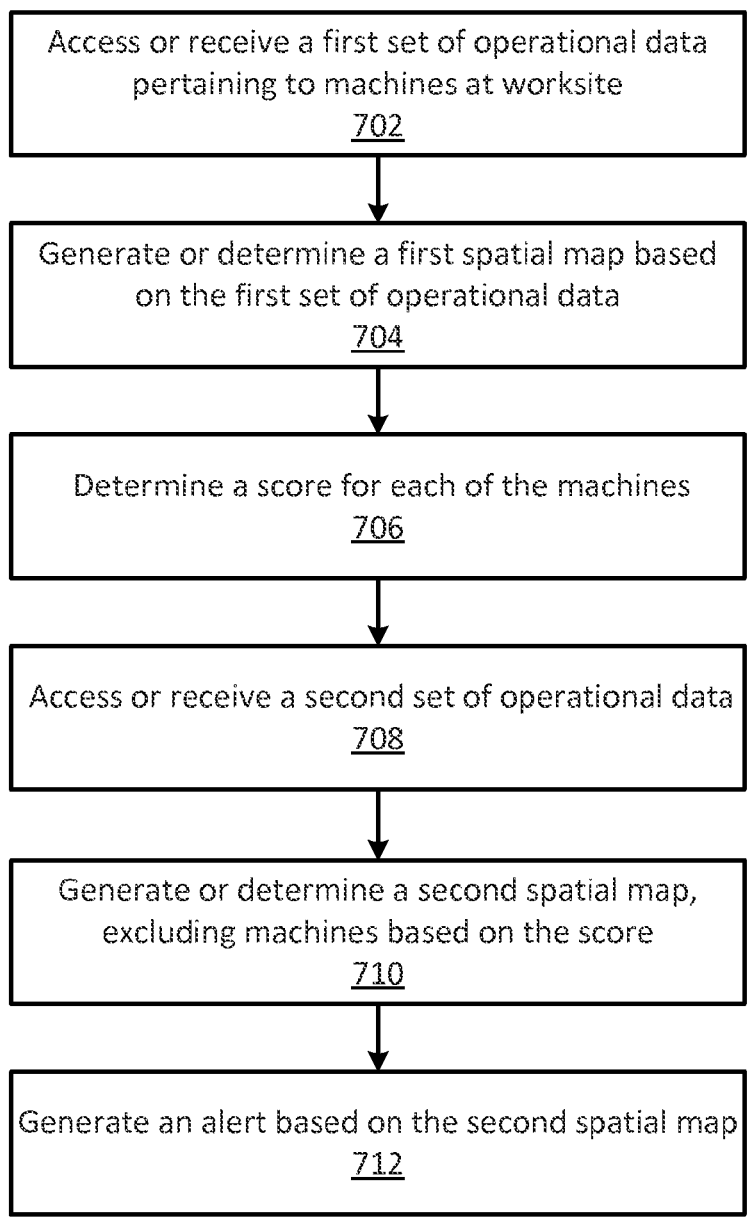
FIG. 7 illustrates a flow diagram of an example method in accordance with aspects of the disclosure.

FIG. 7 illustrates a process flow chart for a method 700 for collision avoidance using a scored-based collision region of interest, according to aspects of the present disclosure. At step 702, a first set of operational data 302 may be accessed or received by, for example, one of the machines 12 at the worksite 10. The operational data 302 may include data collected by each of the other machines 12 at the worksite 10, transmitted to the central station 18, and subsequently transmitted to one of the machines 12 that will perform the method 700 described herein. Operational data 302 may include positional data 304, such as the position, speed, orientation, direction of movement, and/or the projected position of one of the machines 12. The operational data 302 may include machine data 306, such a make and model, dimension, weight, performance characteristic (e.g., top speed, acceleration capability, braking capability, and the like), machine manufacture date or age, and/or usage or maintenance/repair history of one of the machines 12. Machine data 306 may further include real-time performance data of one of the machines 12, such as payload data (e.g., quantity, type, and/or weight) or diagnostic data. Operational data 302 may further include worksite data 308, such as data on the layout of the worksite 10, road information (e.g., road composition, condition, and/or maximum speed), and/or weather information. Operational data 302 may additionally include communication data 310, such as the frequency at which one of the machines provides operational data 302, the time interval since one of the machines 12 has last provided operational data 302, and/or whether one of the machines 12 and its associated data have been included in prior iterations of a spatial map generation.

At step 704, a first spatial map, such as the spatial map 312, is generated or determined based on the first set of operational data 302. The spatial map 312 may be generated or determined by, for example, the control module 20 onboard one of the machines 12. The spatial map 312 may represent the positions of two or more machines 12 of the worksite 10. The spatial map 312 may additionally represent the projected positions, orientations, and/or travel paths of the machines 12. Using the positions, projected positions, orientations, and/or travel paths of the machines, a proximity between each of the machines 12 represented in the spatial map 312 may be determined. The spatial map 312 may be in the form of an X-Y coordinate map, an R-tree, or other data structure.

At step 706, a score, such as the score 314, may be determined for each of the machines 12 at the worksite 10. The score 314 may be determined based on the spatial map 312 and/or the operational data 302. The score 314 may be determined by, for example, the control module 20 onboard one of the machines 12 and may be determined from the perspective of that machine 12 in relation to one of the other machines 12 at the worksite 10. The score 314 may represent a metric by which one of the machines 12 and associated data may be excluded from the creation or update of a spatial map, such as the spatial map 316. The score 314 may represent a degree of criticality between the determining machine 12 and one of the other machines 12, such as a likelihood of a collision between the two machines 12 and/or a severity of a collision, if one were to occur. The score may be represented by a numeral within a pre-defined numerical range or other classification.

The score 314 may be based on one or more parameters that may bear on a degree of criticality (e.g., a likelihood of collision and/or a severity of collision) between the two machines 12. For example, the score 314 may be based on the proximity between the determining machine 12 and the other machine 12, such as determined from the spatial map 312. A parameter used to determine the score 314 may include any data included in the operational data 302, such as positional data 304, machine data 306, worksite data 308, and/or communication data 310. A parameter may be represented as a parameter score, wherein the parameter score may reflect a degree of criticality for that particular parameter. Multiple parameters may be used and/or aggregated to determine the score 314. For example, multiple parameter scores may be mathematically averaged to arrive at the score 314. As another example, one of more parameter scores may be compared against a pre-determined threshold, wherein exceeding the threshold (or not exceeding, as the case may be) may result in a pre-determined value of the score 314.

At step 708, a second set of operational data, such as operational data 302, may be accessed or received by, for example, the control module 20 of the machine 12 that accessed or received the first set of operational data 302 in step 702. The second set of operational data 302 may include new operational data 302 reflecting updated conditions since the first set of operational data 302 was accessed or received. For example, the second set of operational data 302 may include an updated position, speed, direction of travel, or the like of one of the machines 12.

At step 710, a second spatial map, such as the spatial map 316, may be generated or determined while excluding one or more of the machines 12 and its associated data in the second set of operational data 302 based on the score 314 associated with that machine 12. In one aspect, the spatial map 316 may be generated or determined based on the first spatial map of step 704, such as spatial map 312, and the second set of operational data 302 of step 708. For example, the spatial map 316 may be a version of the spatial map 312 updated with the new data (e.g., the most recent positions of the machines 12) of the second set of operational data 302. Optionally, data from the first set of operational data 302 may be used in the generation or determination of the spatial map 316. For instance, not all of the machines 12 may have transmitted an updated position (e.g., where position is not included in the second set of operational data 302), in which case the position for those machines included in the first set of operational data 302 may be used instead.

Based on the score 314 for one or more of the machines 12, that machine 12 and its associated data in the second set of operational data 302 may be excluded from the process of generating or determining the second spatial map 316. For example, if the score 314 of one of the machines 12 indicates a low degree of criticality (e.g., a low likelihood of collision and/or low severity of collision) between that machine 12 and the machine 12 performing the determination of the spatial map 316, that machine 12 and its associated data may be excluded from the determination or generation of the spatial map 316. In order to determine which, if any, of the machines 12 should be excluded, a score threshold may be used, wherein machines 12 with scores 314 at or below the score threshold are excluded. Whether to exclude one of the machines 12 and its associated data may additionally be determined according to values or classifications embodied in the score 314 pointing towards exclusion. For example, if the score 314 of one of the machines 12 embodies a classification of "safe," that machine may be excluded from the generation or determination of the spatial map 316. It will be appreciated that in some aspects, an excluded machine 12 may still be represented in the spatial map 316 in some form, such as where the excluded machine 12 is represented at an earlier position but the position is not updated according to new position data in the second set of operational data 302.

Figure 8:
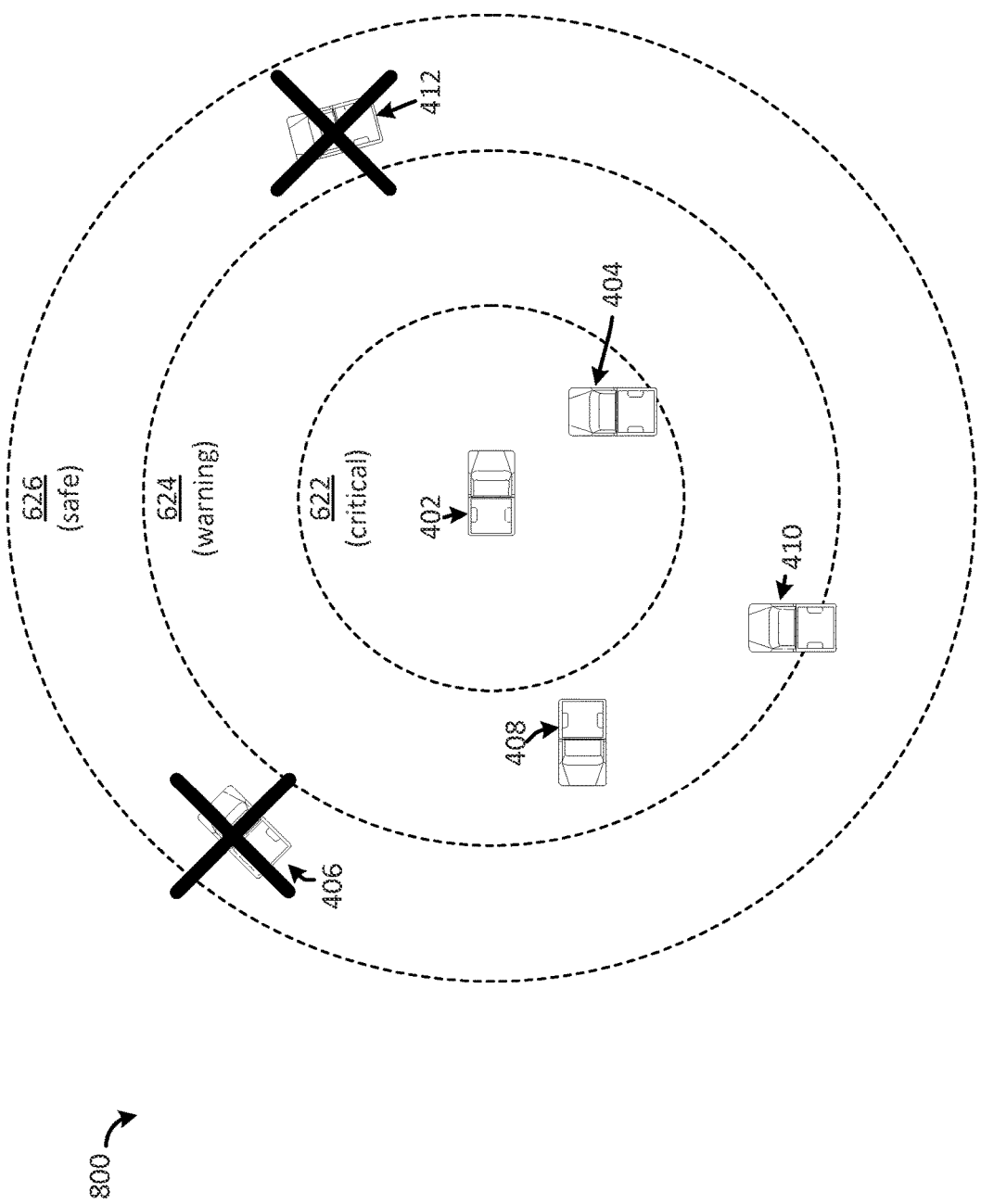
FIG. 8 illustrates a representation of a spatial map in accordance with aspects of the disclosure.

An illustrative example of the process and result of the scored-based exclusion process shall now be provided with reference to FIGS. 4, 6, and 8. FIG. 8 provides an illustration of a second spatial map 800, such as the spatial map 316. The spatial map 800 is an updated version of the spatial map 400 depicted in FIGS. 4 and 6 but with several of the machines excluded from the spatial map 800 based on the respective score 314 for the excluded machines. The three regions 622, 624, and 626 introduced in FIG. 6 and corresponding to a criticality classification (e.g., the score 314 for a machine within that region) are retained in FIG. 8 for illustrative and clarity purposes. In this example, a machine, and its associated data, with a score of "safe" is to be excluded from the process of generating or determining the spatial map 800. This is intended to reflect that a machine with a score of "safe" poses only an acceptably low risk of collision with the machine 402. As determined with respect to FIG. 5, the machines 406 and 412 each have a score of "safe" and, accordingly, are excluded from the spatial map 800. The exclusion is represented in FIG. 8 by an "X" over each of machines 406 and 412. In a visual representation of the spatial map 800, such as might be displayed to an operator of machine 402, machines 406, 412 may be entirely excluded from the visual representation or may be represented in a manner to indicate such exclusion, such as the large "X" as used in FIG. 8, being greyed out, or being partially transparent. The position of each of the non-excluded machines 402, 404, 408, and 410 has been updated in the spatial map 800 according to updated positions accessed or received as part of the second set of operational data 302 (projected positions are not represented in the spatial map 800 for the sake of clarity). It should be noted that the positions of machines 406 and 412 have not been updated because associated new data, such as an updated position, has been excluded from the generation or determination of the spatial map 800.

Figure 9:
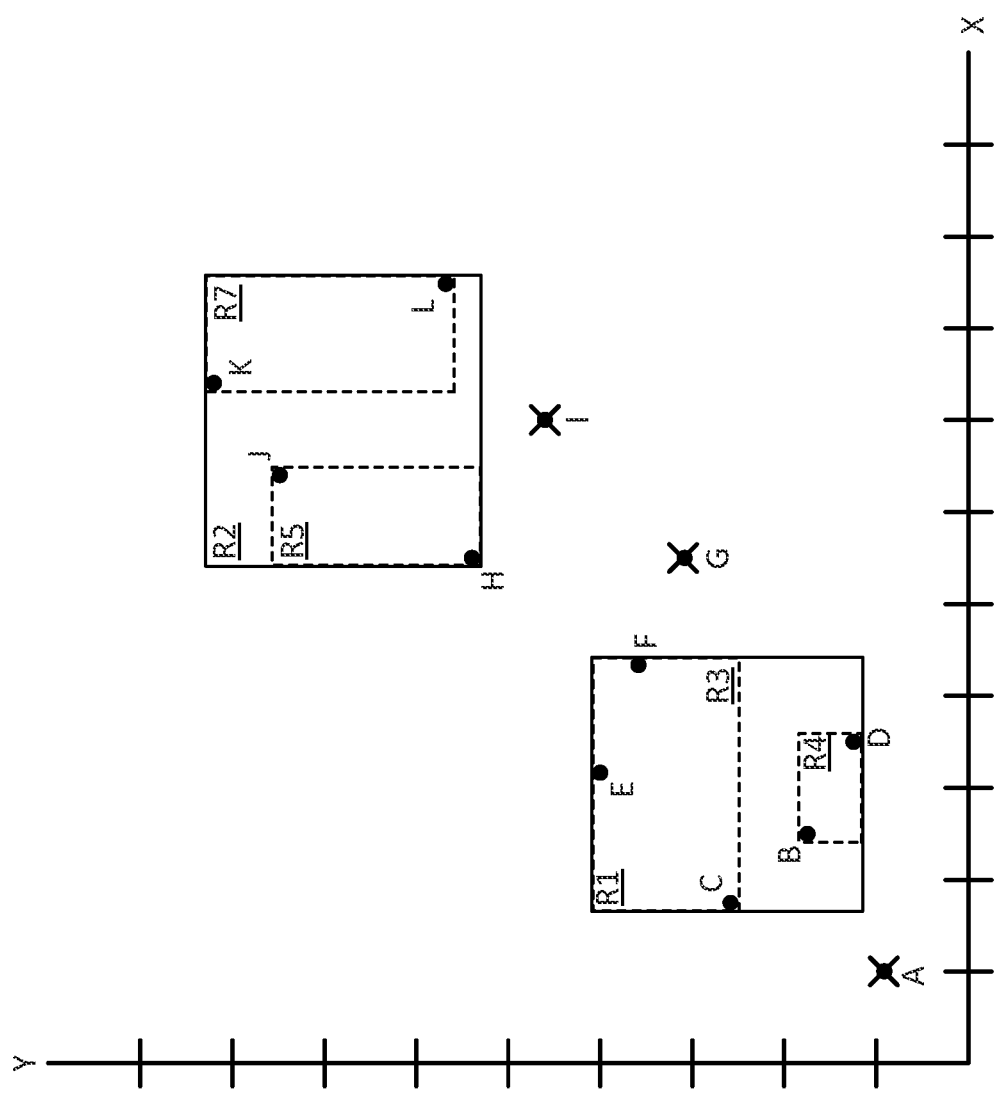
FIG. 9 illustrates a representation of a spatial map in accordance with aspects of the disclosure.

Another illustrative example of the process and result of the scored-based exclusion process shall now be provided with reference to FIGS. 5 and 9. FIG. 9 shows a second spatial map 900, such as the spatial map 316, in the form of a graphic X-Y coordinate representation of an R-tree. The spatial map 900 is an updated version of the spatial map 500 depicted in FIG. 5. The spatial map 900, however, has been generated or determined while excluding one or more of the machines A-L and respective associated data. In this example, the score 314 of each of the machines A, G, and I is determined to be below a pre-defined threshold and, therefore, the machines A, G, and I and respective associated data are excluded from the generation or determination of the spatial map 900. For illustrative purposes, the exclusion of the machines A, G, and I are represented by an "X" over each. Since the machines A, G, and I are excluded, the regions R1-R7 of the spatial map 900 may be re-defined accordingly. Region R1 may be redefined to encompass the machines B-F. Region R3 may be redefined to encompass the machines C, E, and F. Region R4 may be redefined to encompass the machines B and D. Region R2 may be redefined to encompass the machines H, J, K, and L. Region R5 may be redefined to encompass the machines H and J. Region R6 may be eliminated due to the exclusion of the machines G and I. Region R7 may remain unmodified. Due to the exclusion of the machines A, G, and I, the generation or determination of the spatial map 900 may be simplified since less data points must be considered in determining the grouping of the machines C-F, H, and J-L into the regions R1-R5 and R7. Similarly, the exclusion serves to eliminate one region, the region R6, which may provide for a less computationally-intense use of the spatial map 900 to determine proximities.

At step 712, an alert, such as the alert 318, may be generated based on the second spatial map, such as the spatial map 316, of step 710. The alert 318 may be generated, for example, by the control module 20 of the machine 12 generating or determining the spatial map 316. The alert 318 may be triggered by a determination of proximity using the spatial map 316. For example, if one of the machines 12 is too close to the machine 12 generating or determining the spatial map 316, the alert 318 may be generated. The alert 318 may be embodied in a visual alert on the display of the operator interface module 22 of the machine 12, such as a text message or visual indicator (e.g. a change in color) in a visual representation or display of the spatial map 316 viewed by the operator. The alert 318 may additionally be embodied in an audio alert, such as an alarm or siren sound.

Whether such functionality is implemented as hardware or software depends upon the design constraints imposed on the overall system. Skilled persons may implement the described functionality in varying ways for each particular application, but such implementation decisions should not be interpreted as causing a departure from the scope of the disclosure. In addition, the grouping of functions within a module, block, or step is for ease of description. Specific functions or steps may be moved from one module or block without departing from the disclosure.

The various illustrative logical blocks and modules described in connection with the aspects disclosed herein may be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor (e.g., of a computer), or in a combination of the two. A software module may reside, for example, in RAM memory, flash memory, ROM memory, EPROM memory, EEPROM memory, registers, hard disk, a removable disk, a CD-ROM, or any other form of storage medium. An example storage medium may be coupled to the processor such that the processor may read information from, and write information to, the storage medium. In the alternative, the storage medium may be integral to the processor. The processor and the storage medium may reside in an ASIC.

In at least some aspects, a processing system (e.g., the control module 20) that implements a portion or all of one or more of the technologies described herein may include a general-purpose computer system that includes or is configured to access one or more computer-accessible media.

Figure 10:
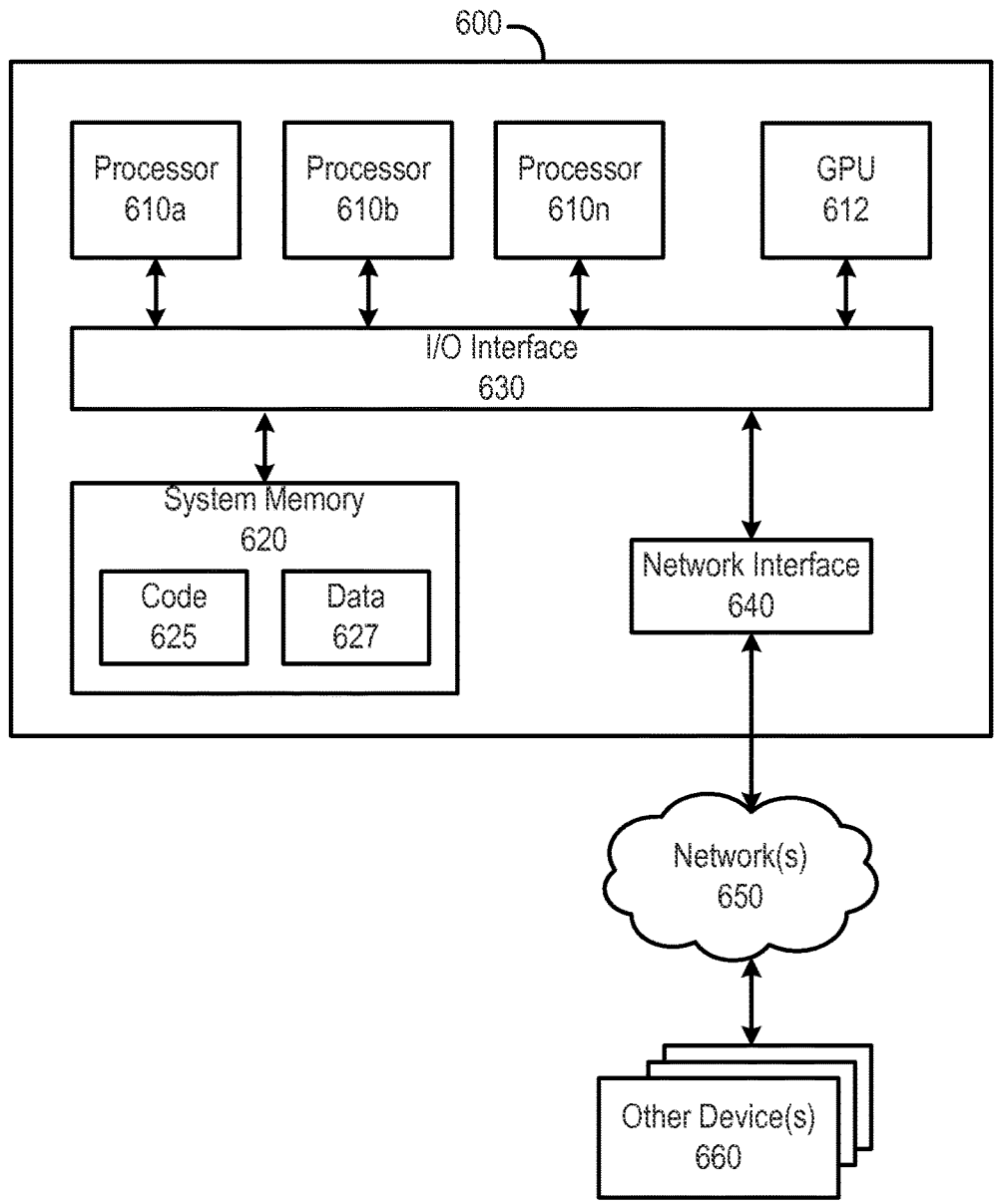
FIG. 10 illustrates a block diagram of a computer system configured to implement the method of FIG. 7.

FIG. 10 depicts a general-purpose computer system that includes or is configured to access one or more computer-accessible media. In the illustrated aspect, a computing device 600 may include one or more processors 610a, 610b, and/or 610n (which may be referred herein singularly as the processor 610 or in the plural as the processors 610) coupled to a system memory 620 via an input/output (I/O) interface 630. The computing device 600 may further include a network interface 640 coupled to an I/O interface 630.

In various aspects, the computing device 600 may be a uniprocessor system including one processor 610 or a multiprocessor system including several processors 610 (e.g., two, four, eight, or another suitable number). The processors 610 may be any suitable processors capable of executing instructions. For example, in various aspects, the processor(s) 610 may be general-purpose or embedded processors implementing any of a variety of instruction set architectures (ISAs), such as the x86, PowerPC, SPARC, or MIPS ISAs, or any other suitable ISA. In multiprocessor systems, each of the processors 610 may commonly, but not necessarily, implement the same ISA.

In some aspects, a graphics processing unit ("GPU") 612 may participate in providing graphics rendering and/or physics processing capabilities. A GPU may, for example, include a highly parallelized processor architecture specialized for graphical computations. In some aspects, the processors 610 and the GPU 612 may be implemented as one or more of the same type of device.

The system memory 620 may be configured to store instructions and data accessible by the processor(s) 610. In various aspects, the system memory 620 may be implemented using any suitable memory technology, such as static random access memory ("SRAM"), synchronous dynamic RAM ("SDRAM"), nonvolatile/Flash®-type memory, or any other type of memory. In the illustrated aspect, program instructions and data implementing one or more desired functions, such as those methods, techniques and data described above, are shown stored within the system memory 620 as code 625 and data 627.

In one aspect, the I/O interface 630 may be configured to coordinate I/O traffic between the processor(s) 610, the system memory 620 and any peripherals in the device, including a network interface 640 or other peripheral interfaces. In some aspects, the I/O interface 630 may perform any necessary protocol, timing or other data transformations to convert data signals from one component (e.g., the system memory 620) into a format suitable for use by another component (e.g., the processor 610). In some aspects, the I/O interface 630 may include support for devices attached through various types of peripheral buses, such as a variant of the Peripheral Component Interconnect (PCI) bus standard or the Universal Serial Bus (USB) standard, for example. In some aspects, the function of the I/O interface 630 may be split into two or more separate components, such as a north bridge and a south bridge, for example. Also, in some aspects some or all of the functionality of the I/O interface 630, such as an interface to the system memory 620, may be incorporated directly into the processor 610.

The network interface 640 may be configured to allow data to be exchanged between the computing device 600 and other device or devices 660 attached to a network or networks 650, such as other computer systems or devices, for example. In various aspects, the network interface 640 may support communication via any suitable wired or wireless general data networks, such as types of Ethernet networks, for example. Additionally, the network interface 640 may support communication via telecommunications/telephony networks, such as analog voice networks or digital fiber communications networks, via storage area networks, such as Fibre Channel SANs (storage area networks), or via any other suitable type of network and/or protocol.

In some aspects, the system memory 620 may be one aspect of a computer-accessible medium configured to store program instructions and data as described above for implementing aspects of the corresponding methods and apparatus. However, in other aspects, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device the 600 via the I/O interface 630. A non-transitory computer-accessible storage medium may also include any volatile or non-volatile media, such as RAM (e.g., SDRAM, DDR SDRAM, RDRAM, SRAM, etc.), ROM, etc., that may be included in some aspects of the computing device 600 as the system memory 620 or another type of memory. Further, a computer-accessible medium may include transmission media or signals, such as electrical, electromagnetic or digital signals, conveyed via a communication medium, such as a network and/or a wireless link, such as those that may be implemented via the network interface 640. Portions or all of multiple computing devices, such as those illustrated in FIG. 10, may be used to implement the described functionality in various aspects; for example, software components running on a variety of different devices and servers may collaborate to provide the functionality. In some aspects, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may include any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computer or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the disclosure may be practiced with other computer system configurations.

Conditional language used herein, such as, among others, "may," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular aspect. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of aspects disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of aspects disclosed herein. The accompanying claims and their equivalents are intended to cover such forms or modifications as would fall within the scope and spirit of certain aspects disclosed herein.

The preceding detailed description is merely example in nature and is not intended to limit the disclosure or the application and uses of the disclosure. The described aspects are not limited to use in conjunction with a particular type of machine. Hence, although the present disclosure, for convenience of explanation, depicts and describes particular machine, it will be appreciated that the assembly and electronic system in accordance with this disclosure may be implemented in various other configurations and may be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), Long Term Evolution (LTE), W-CDMA (Wideband Code-Division Multiple Access), Wireless Fidelity (Wi-Fi), Bluetooth, and/or the like, and/or a combination of two or more thereof.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context.

I claim:

1. A method comprising:
receiving, by one or more processors, data relating to a plurality of machines disposed at a worksite, the data comprising at least one of a position, speed, and direction of movement for at least one machine of the plurality of machines;
determining, by one or more processors, based on the at least one of the position, speed, and direction of movement, a score for the at least one machine of the plurality of machines, the score representing a criticality;
based at least on the determined score, selecting, by one or more processors, a group of machines from the plurality of machines;
determining, by one or more processors, a spatial map representing a position for at least one machine of the selected group of machines; and
determining, by one or more processors, based at least on the spatial map, a likelihood of collision for the at least one machine of the selected group of machines.

2. The method of claim 1, further comprising:
generating an alert to be perceived by an operator based on the determining of the likelihood of collision.

3. The method of claim 1, further comprising:
receiving, by one or more processors, second data relating to the plurality of machines, the second data comprising a proximity, based at least on the spatial map, between two machines of the plurality of machines;
determining, by one or more processors, based at least on the second data, a second score for at least one machine of the plurality of machines, the second score representing a second criticality;
based at least on the second score, selecting, by one or more processors, a second group of machines from the plurality of machines; and
determining, by one or more processors, a second spatial map representing a position for at least one machine of the selected second group of machines.

4. The method of claim 1, wherein one or more machines of the plurality of machines is excluded from the group of machines based at least on the score.

5. The method of claim 1, wherein the selecting the group of machines comprises comparing the score for the at least one machine of the plurality of machines to a threshold.

6. The method of claim 1, wherein the criticality represents at least a proximity between two or more machines of the plurality of machines.

7. A system comprising:
a processor; and
a memory bearing instructions that, upon execution by the processor, cause the system at least to:
receive data relating to a plurality of machines disposed at a worksite, the data comprising at least one of a position, speed, and direction of movement for at least one machine of the plurality of machines;
determine, based on the at least one of the position, speed, and direction of movement, a score for the at least one machine of the plurality of machines, the score representing a criticality;
based at least on the score, select a group of machines from the plurality of machines; and
determine a spatial map representing a position for at least one machine of the selected group of machines.

8. The system of claim 7, further comprising:
determine, based at least on the spatial map, a likelihood of collision for the at least one machine of the selected group of machines.

9. The system of claim 8, further comprising:
generate an alert to be perceived by an operator based on the determining of the likelihood of collision.

10. The system of claim 7, further comprising
receive second data relating to the plurality of machines, the second data comprising a proximity, based at least on the spatial map, between two machines of the plurality of machines;
determine, based at least on the second data, a second score for at least one machine of the plurality of machines, the second score representing a second criticality;
based at least on the second score, select a second group of machines from the plurality of machines; and
determine a second spatial map representing a position for at least one machine of the selected second group of machines.

11. The system of claim 7, wherein one or more machines of the plurality of machines is excluded, based at least on the score, from the group of machines.

12. The system of claim 7, wherein selecting the group of machines comprises comparing the score for the at least one machine of the plurality of machines to a threshold.

13. The system of claim 7, wherein the criticality represents at least a proximity between two or more machines of the plurality of machines.

14. A non-transitory computer readable storage medium bearing instructions that, upon execution by one or more processors, effectuate operations comprising:
receiving data relating to a plurality of machines disposed at a worksite, the data comprising at least one of a position, speed, and direction of movement for at least one machine of the plurality of machines;
determining, based on the at least one of the position, speed, and direction of movement, a score for the at least one machine of the plurality of machines, the score representing a criticality;
based at least on the score, selecting a group of machines from the plurality of machines; and
determining a spatial map representing a position for at least one machine of the selected group of machines.

15. The non-transitory computer readable storage medium of claim 14, the operations further comprising:
determining, based at least on the spatial map, a likelihood of collision for the at least one machine of the selected group of machines.

16. The non-transitory computer readable storage medium of claim 15, the operations further comprising:
generating an alert to be perceived by an operator based on the determining of the likelihood of collision.

17. The non-transitory computer readable storage medium of claim 14, the operations further comprising:
receiving second data relating to the plurality of machines, the second data comprising a proximity, based at least on the spatial map, between two machines of the plurality of machines;
determining, based at least on the second data, a second score for at least one machine of the plurality of machines, the second score representing a second criticality;
based at least on the second score, selecting a second group of machines from the plurality of machines; and determining a second spatial map representing a position for at least one machine of the selected second group of machines.

18. The non-transitory computer readable storage medium of claim 14, wherein one or more machines of the plurality of machines is excluded, based at least on the score, from the group of machines.

19. The non-transitory computer readable storage medium of claim 14, wherein selecting the group of machines comprises comparing the score for the at least one machine of the plurality of machines to a threshold.

20. The non-transitory computer readable storage medium of claim 14, wherein the criticality represents at least a proximity between two or more machines of the plurality of machines.

\* \* \* \* \*